Aug. 12, 1958     F. C. GROSS     2,847,108
ARTICLE ORIENTING AND CONVEYING MECHANISMS
Filed Sept. 25, 1957     5 Sheets-Sheet 1
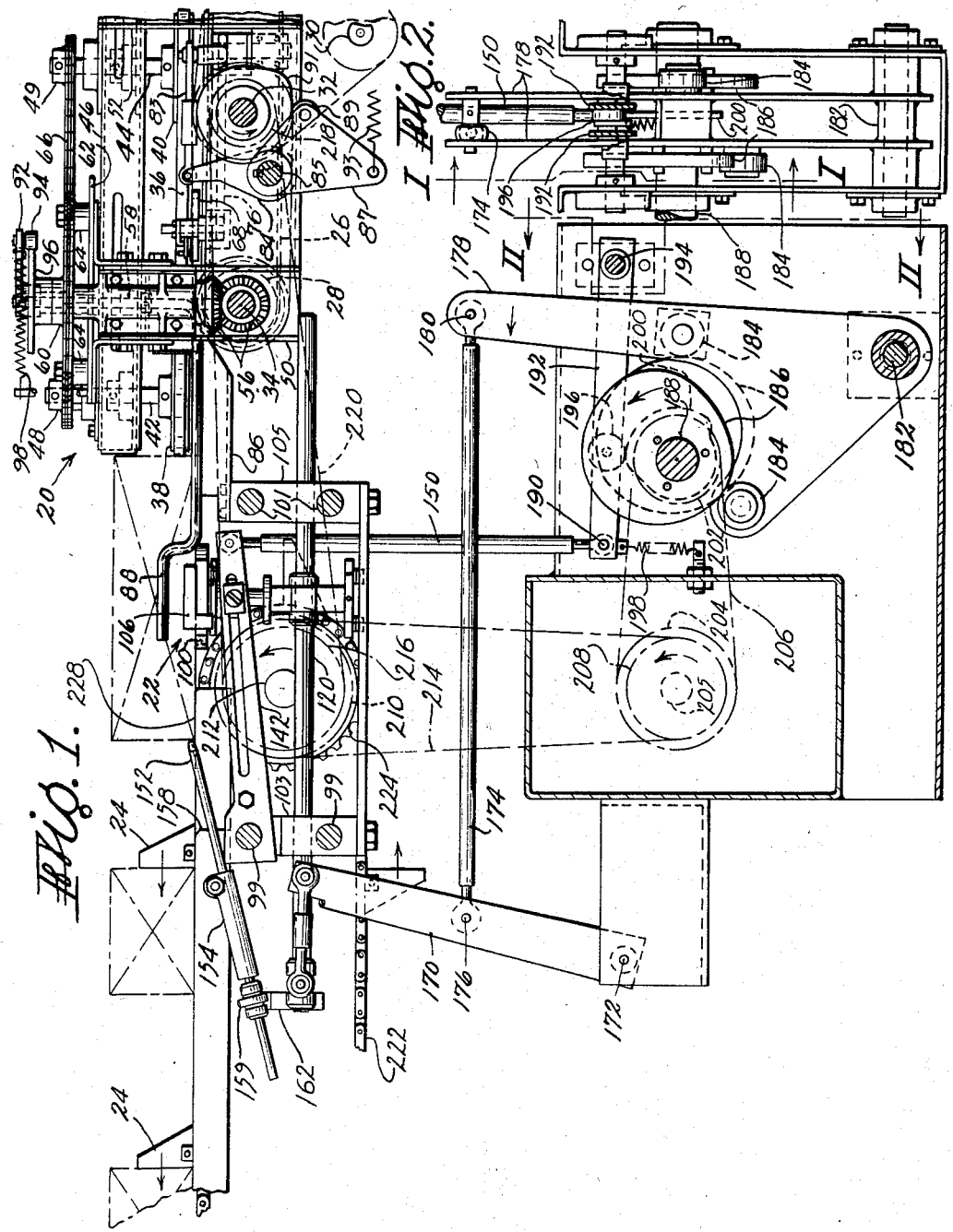
INVENTOR.
Frank C. Gross
BY Chapin & Neal
ATTORNEYS

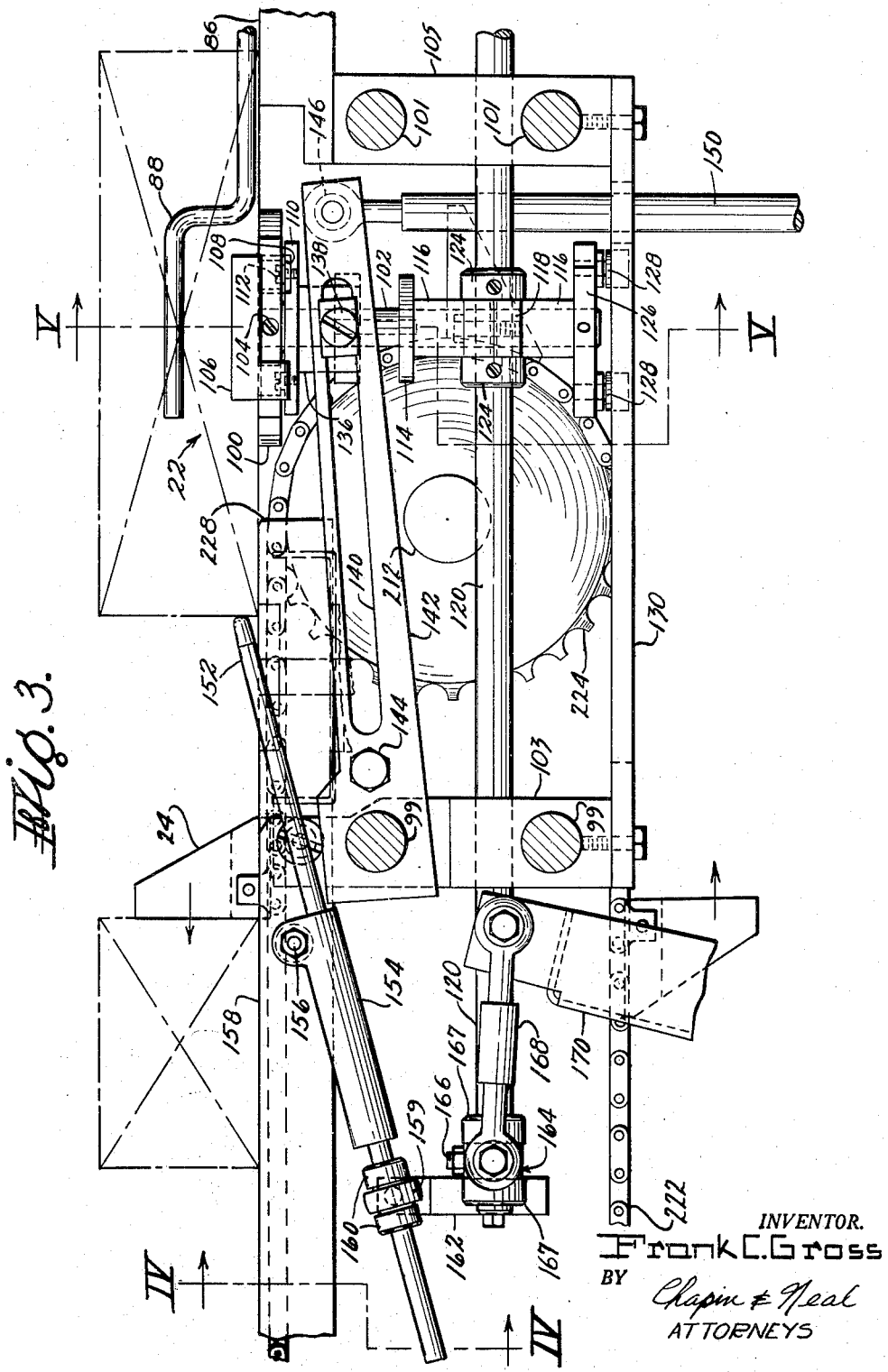

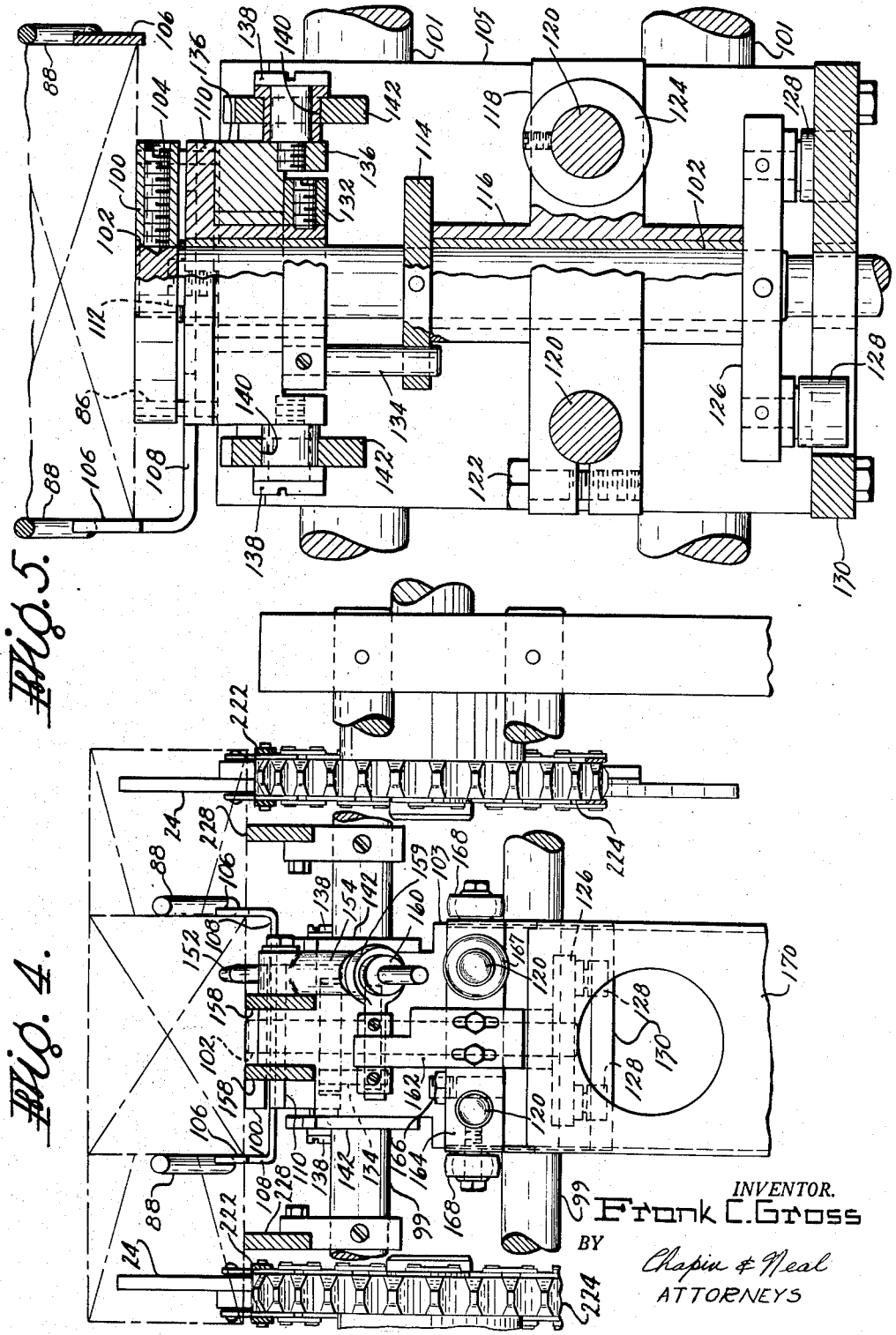

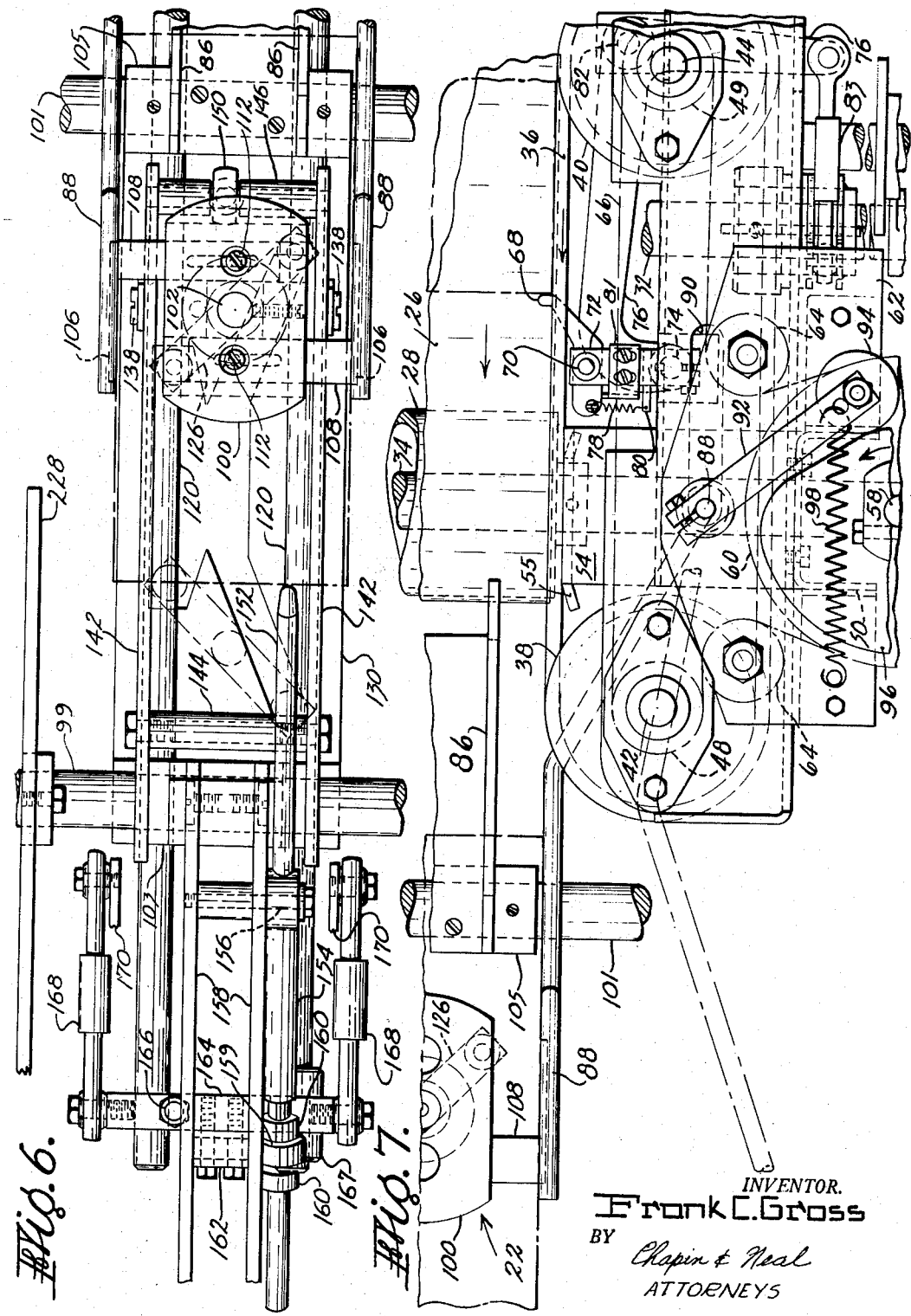

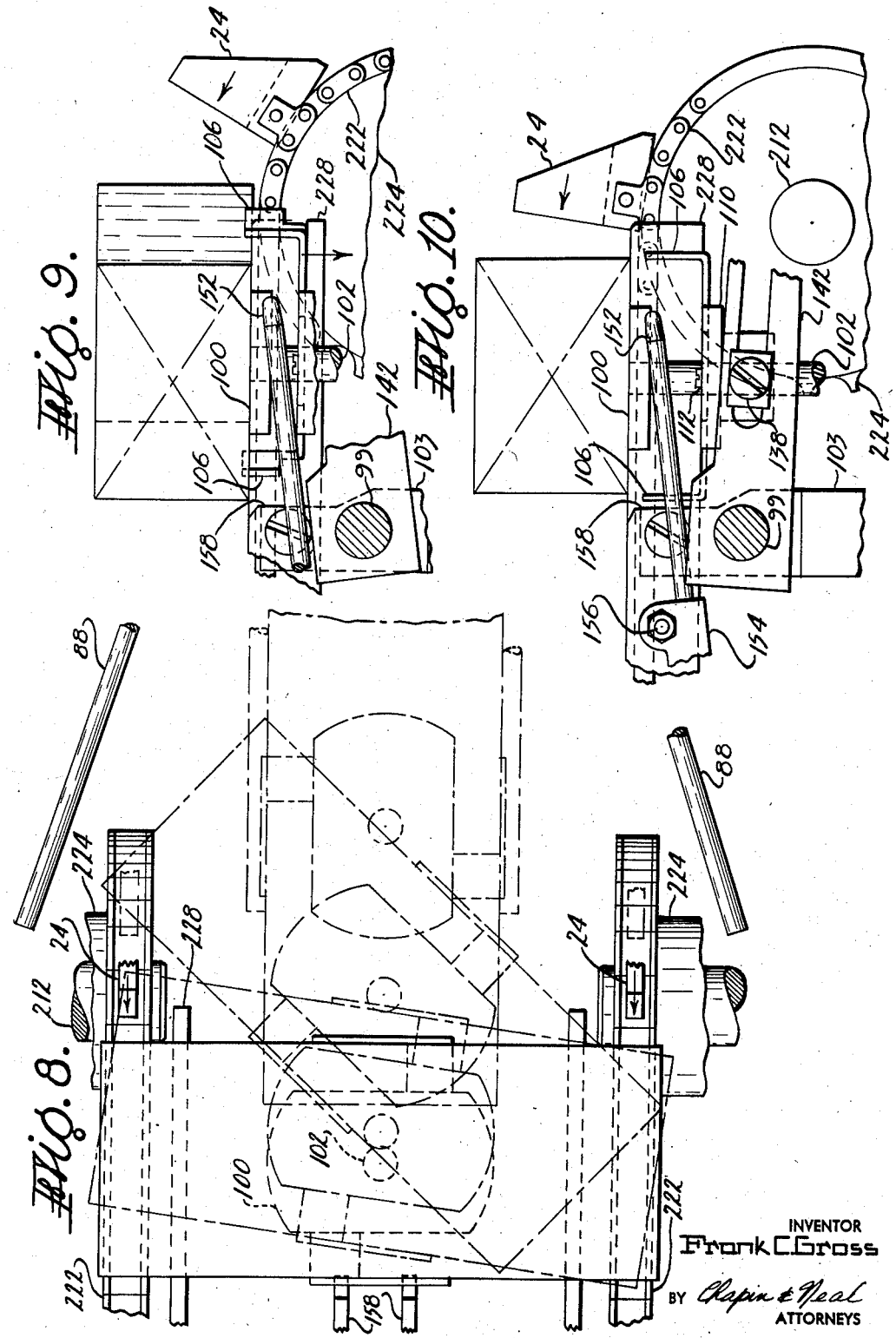

United States Patent Office 2,847,108
Patented Aug. 12, 1958

2,847,108
ARTICLE ORIENTING AND CONVEYING MECHANISMS

Frank C. Gross, Wilbraham, Mass., assignor to Package Machinery Company, East Longmeadow, Mass., a corporation of Massachusetts Application September 25, 1957, Serial No. 686,077

6 Claims. (Cl. 198—33)

The present invention relates to the handling of articles and more particularly to improved means for changing the orientation of articles as they are conveyed from one operation to another.

The invention has for its object to increase the speed with which article orientation may be changed through the use of simple and reliable automatic means.

One illustrative use of the present invention is found in packaging doughnuts. Such a packaging set-up may advantageously comprise a carton forming machine which automatically discharges elongated cartons onto moving conveyor with the long dimension of the cartons disposed longitudinally of the conveyor. The cartons are carried past workers who manually place the doughnuts in the cartons. After being filled the cartons are carried to the device of the present invntion which rotates the cartons 90° and transfers them to a second conveyor which advances the cartons past means which are then able to automatically close the top flap of the thus oriented carton. The cartons are in a condition to be wrapped in a film or wrapper or shipped immediately for retail sale.

As will hereinafter appear the present invention has many and varied potential uses and will be found beneficial in fields other than packaging.

The above and other related objects and features of the invention including its novel constructional features will be apparent from a reading of the following description of the disclosure found in the accompanying drawings and the particular novelty thereof pointed out in the appended claims.

In the drawings:

Fig. 1 is a side elevation, taken inside the outermost frame members and partly on line I—I in Fig. 2, of an orienting device embodying the present invention;

Fig. 2 is a view taken on line II—II in Fig. 1, with certain portions broken away and others in section;

Fig. 3 is a view, on an enlarged scale, showing certain mechanism seen in Fig. 1 in greater detail;

Fig. 4 is a section taken on line IV—IV in Fig. 3;

Fig. 5 is a section taken on line V—V in Fig. 3;

Fig. 6 is a plan view of the mechanism seen in Fig. 3;

Fig. 7 is a plan view of mechanism on the infeed side of what is seen in Fig. 6;

Fig. 8 is a fragmentary plan view showing progressive positions of an article as it is oriented; and Figs. 9 and 10 are fragmentary elevations showing two successive positions of an article.

A general understanding of the device herein disclosed may be had by reference to Fig. 1. Articles such as doughnut cartons are fed by infeed conveyor means 20 as from a loading station and released one at a time to a turntable 22. The turntable 22 receives the carton with its long dimension longitudinally disposed advances it in a leftward direction and at the same time rotates the carton 90° to dispose its long dimension and top flap transversely of the path of its advance. After being thus rotated and oriented the articles or cartons are carried away by further conveyor means comprising spaced lugs 24 which move in proper timed relation to carry the articles toward work treating means (not illustrated), as for example a device for automatically closing the top of the carton.

The infeed means 20 comprise (Figs. 1 and 7) a belt 26 trained over a roll 28 and a further roll, not shown. The roll 28 is driven from a main power shaft 30 by way of the indicated chains and sprockets associated with a jack shaft 32 and connecting with a shaft 34 to which the roll 28 is secured.

Further infeed means include a pair of spaced V-belts 36 (only one of which is shown) at either side and above the belt 26. The mounting of the two belts 36 may be identical and the present description will suffice for an understanding of their function. The illustrated belt 36 is trained around pulleys 38, 40 which are pinned to vertical shafts 42, 44. The shafts 42, 44 are journaled on a channel member 46 and are provided with sprockets 48, 49 at their upper ends. The channel member 46 is secured to fixed vertical posts 50, 52 by a slotted arrangement which permits longitudinal adjustment of the belt 36. A back up plate 55 may be provided for the belt 36 and depend from a plate 54 extending from the post 50.

Power for driving the belt 36 is taken from the shaft 34 through a pair of bevel gears 56 which rotate a vertical shaft 58. Near the upper end of shaft 58 is pinned a sprocket 60. At the upper end of post 50, a plate 62 is fastened to provide mounting means for a pair of idler sprockets 64. A chain 66 is trained around the sprockets 48, 49, 60 and 64 to complete the driving means for the belt 36 in a manner which permits the aforementioned longitudinal adjustment and yet keeps a satisfactory number of sprocket teeth in mesh with the chain 66.

A stop 68, best seen in Fig. 7, extends above the belt 26 and positions articles for release to the turntable 22. This stop is pivotally mounted on a pin 70 depending from a bracket 72 which in turn is fast upon a post 74 secured on an outturned end of a bell crank 76. A tension spring 78 is hooked over a pin 80 extending from the bracket 72 and connects with the stop 68 to urge it in a counterclockwise direction as limited by a stop plate 81 adjustably secured to bracket 72. The bell crank 76 is pivotally mounted on a fixed pin 82 and extends outwardly to connect with a link 83. The link 83 is connected to a lever 84 which is fast upon a rotatable shaft 85 with a follower plate 87 also fast upon said shaft 85. A roll 89 is carried by the plate 87 and bears against a cam 91 under the influence of a spring 93. The cam 91 is secured to shaft 32 so that it bears a predetermined timed relation to the operation of the turntable 22 as will be developed later in greater detail. The above described linkage mechanism, under the control of cam 91 swings the bell crank 76 in a counterclockwise direction to retract the stop 68 and release an article for advancement to the turntable 22. Almost immediately lever 76 returns to the position illustrated in Fig. 7 causing the stop 68 to yieldably bear against the article being released and then immediately project in front of the next succeeding article.

As the article is thus released it is carried beyond the end of belt 26 by the belts 36 which advance the article over fixed rails 86 and onto the turntable 22. Guides 88 (Figs. 1, 6 and 7) are provided at either side of the path of article travel to insure proper lateral positioning of the article as it is advanced onto the turntable. The mounting of the two guides 88 may be identical and therefore such mounting is shown and described for only one of said guides (again see Figs. 1 and 7). The guide 88 extends from the turntable 22 to a point adjacent the post 50, where it is bent upwardly and extends through slots 90 in the channel member 46 and terminates thereabove. Appropriate means are provided for journaling the vertical portion of the guide 88 on the member which carries the back up plate 55. An arm 92 is secured to the upper end of the guide 88 and carries a roll 94 at its outer end, which roll is maintained in engagement with a cam 96 by a spring 98. The cam 96 is secured to the upper end of the shaft 58 and so timed that the guide 88 will be in its full line position when each article is released and advanced onto the turntable 22. Thereafter the cam 96 moves the guide to the phantom position as seen in Fig. 7 as the turntable 22 moves in a leftward direction and commences to rotate the article. It will be appreciated, of course, that both guides swing outwardly simultaneously.

Construction of and control means for the turntable 22 will now be explained by first making reference to Figs. 3 and 5. It may first be noted that the primary support for the turntable 22 is provided by two pairs of cross bars 99 and 101 which are approximately secured in the side frames of the machine. These cross bars respectively support blocks 103 and 105. In passing, it will be seen that the guides 86 are supported by the block 105.

The turntable comprises an article receiving platform 100 which is secured to the upper end of a vertical shaft 102 by a set screw 104. Side guides 106 are found at either side of the platform 100 and have legs 108 which underlie the platform 100 and are fastened to a flanged sleeve 110 by screws 112. These screws are accessible through holes in the platform 100 (see also Fig. 6) to facilitate accurate adjustment of the side guides to the width of the articles. The vertical position of the shaft 102 is controlled by a collar 114 pinned thereto and bearing against a boss 116 formed integrally with a crossbar 118 which is secured to a pair of longitudinally extending rods 120, these rods in turn being slidably mounted in the blocks 103, 105. A split clamp arrangement including screw 122 secures the bar 118 to one rod 120 while a pair of locking collars 124 secure it to the other rod 120.

The rods 120 are reciprocated by later-described means to move the turntable between the full line article receiving position and a position which in the lugs 24 will carry away the rotated article. Rotation of the turntable 22 is effected in the following manner. A cross arm 126 (Figs. 3 and 5) is pinned to the lower end of shaft 102 and is provided with rollers 128 at its outer ends. These rollers are guided by appropriate camming surfaces in a cam plate 130 affixed to the blocks 103, 105 and, as will be seen from Fig. 6, the arrangement is such that the cross arm 118 is rotated (and with it the turntable 22) 90° when moved from the full line to the phantom position.

It is essential that the guides 106 rotate with the platform 100 and yet it is necessary to lower them beneath the surface of said platform to permit articles to be carried away by the lugs 24. This is accomplished by affixing a ring 132 to the lower end of flanged sleeve 110 (to which the guides are attached) with a depending pin 134 fixed therein and slidably received by a hole in the collar 114. With this arrangement it will be apparent that the guides 106 will rotate with the platform 100 and yet are free for vertical reciprocation.

Vertical reciprocation of the guides 106 is effected by way of a member 136 (Fig. 5) rotatably captured between the flange of sleeve 110 and ring 132. Bushed shoulder screws 138 are threaded into a depending flange of the member 136 and captured in slots 140 in arms 142 (Figs. 3 and 5). The arms 142 are rigidly spaced by cross members at 144 and 146 (Fig. 7) and pivotally mounted on the upper cross shaft 97. A depending link 150 is connected to the cross member 146 and is reciprocated by later-described means to pivot the arms 142.

When an article is advanced onto the turntable 22 its speed is sufficient to make preferable positive stop means for insuring that it will be centrally positioned on the turntable. These means may take the form of a finger or rod 152 (Fig. 3) slidably mounted in a sleeve 154 which in turn is pivotally mounted at 156 to one of a pair of fixed rails 158. An eye pin 159 (see also Fig. 4) is secured to the lower end of rod 152 by locking collars 160, said eye pin also being pivotally mounted on a block 162 which is secured to a cross bar 164 extending between the rods 120. A billbinder 166 secures the bar 164 to one rod 120 while a pair of locking collars 167 secure it to the other rod 120. A pair of links 168 are pivotally connected at opposite ends to the bar 164 and upstanding flanges of a lever 170. The lever 170 is pivotally mounted on a frame member at 172 (Fig. 1) with a link 174 pivotally connected thereto at 176. The other end of link 174 is pivotally connected to and between the upper ends of a pair of levers 178 at 180 (see also Fig. 2), with the levers 178 being pivotally mounted about a fixed center at 182. Followers 184 on the lever 178 engage conjugate cams 186 which are secured on shaft 188, these cams thus control, through the described linkage, reciprocable movement of the rods 120 and the turntable 22.

The link 150 is pivotally connected at 190 (Fig. 1) to and between a pair of arms 192 which in turn are pivotally mounted about a fixed center at 194. A follower 196 is provided on the arm 192, with a spring 198 urging the follower into engagement with a cam 200 also secured to the shaft 188. The cams 186 and 200 are rotated through the following chain and sprocket arrangement. Sprockets 202, 204 are respectively secured to the shaft 188 and a cross shaft 205 and are interconnected by a chain 206. Sprockets 208, 210 are respectively secured to the shaft 205 and a stub shaft 212 and are interconnected by a chain 214. Sprockets 216, 218 are respectively secured to shafts 212 and 32 and are interconnected by a chain 220. The cams 186, 200 are thus driven in predetermined relation with the cams 91 and 94 from the common power shaft 30.

The take-off conveyor means include the lugs 24 which are carried by transversely spaced chains 222 (Figs. 3, 4 and 8) which pass around sprockets 224 each sprocket being mounted on stub shafts (one of which is the shaft 212) extending from opposite side frames (not shown). The chains 222 may be driven in predetermined timed relation by driving one of the sprockets 224 directly from the sprocket 210. Both chains 222 pass around other sprockets not shown, these other sprockets may be pinned to a common cross shaft which will thus fix the movement of both chains 222 in the desired timed relationship. The conveyor means further include the above-mentioned rails 158 and a pair of longer rails 228, all of which are spaced somewhat above the chains 222 to provide a platform over which articles are advanced by the lugs 24.

As has been indicated the various elements of the present device operate in predetermined timed relation. This timed relation in combination with the relative arrangement of parts enables rates of operation hitherto impractical if not impossible.

When the turntable 22 approaches or has reached the article receiving position seen in full lines, an article is released and advanced onto the platform 100 by the belts 36. At this time the guide fingers are at their innermost positions to assure advance of the released article centrally on the platform 100. The platform guides 106 are also raised and the stop finger 152 is raised to center the article in a longitudinal sense. Then as the turntable 22 starts to move in a leftward direction under the influence of conjugate cams 186, the guides 88 are swung outwardly to the phantom position seen in Fig. 8 as by cam 96 and the stop finger 152 lowered. The turntable is gradually rotated by the cam plate 130 to turn the article through 90°. During this leftward movement it will be noted that the platform guides 106 remain above the level of the platform 100 until the turntable has almost reached or in fact has reached its final discharge position, whereupon the cam 200 will cause the arms 142 to be lowered rapidly thus clearing the way for the article to be carried away from the platform 100.

One of the more important timing features of the present device is illustrated in Figs. 8-10. It will there be seen that it is necessary to swing one end of the article above the lug 24 which is to assist in carrying the article away from the turntable. The arrangement is such that the article may pass above such lug and then the lug will immediately come up behind the article (Fig. 9) and when the article has been rotated the full 90° both lugs 24 will be ready to immediately advance it along the rails 158, 228.

As soon as movement of the article is controlled by the lugs 24, the turntable is returned to its article receiving position by the cams 186. During this return movement the cam 198 maintains the platform guides 106 below the platform until the turntable returns or has almost completed its return to the article receiving position.

While a specific embodiment has been herein described, it is to be understood that many variations are encompassed within the scope of this invention. Such variations include, by way of illustration and not as any limitation, the number of degrees which the article is rotated, the manner in which articles are carried from the platform and the use or lack of use of such elements as the guides 88, even though such elements contribute to the more particularized inventive concepts.

Having thus described the invention, what is claimed as novel and desired to be secured by Letters Patent of the United States is:

1. Article orienting mechanism comprising infeed conveyor means, and discharge conveyor means aligned to carry articles through a substantially straight path of movement, a turntable movable between said conveyor means, means for rotating said turntable as it is so moved, means for releasing one article at a time from the infeed conveyor in proper timed relation to the movement of the turntable for the article to be properly seated on the turntable, guide means spaced apart the width of the article and disposed between the infeed conveyor means and the turntable when an article is released, and means for withdrawing said guide means from the path of movement of the article as soon as the turntable commences to rotate.

2. Article orienting mechanism comprising infeed and discharge conveyor means aligned to carry articles through a substantially straight path of movement, a turntable movable between said conveyor means, means for rotating said turntable as it is so moved, side guides on said turntable and extending thereabove to position articles laterally thereon as they are received from the infeed conveyor means and maintain them in that position as the turntable is rotated and means for lowering said side guides when the turntable is moved to the discharge conveyor means.

3. Article orienting mechanism comprising infeed conveyor means, discharge conveyor means aligned to carry articles through a substantially straight path of movement, a turntable movable between said conveyor means to transfer articles from the infeed to the discharge conveyor means, means for rotating the turntable as it is so moved, means for releasing one article at a time from the infeed conveyor means in proper timed relation for the article to be seated on the turntable, guide means spaced apart the width of the article and disposed between the infeed conveyor means and the turntable when an article is released, means for withdrawing said guide means from the path of movement of said article as soon as the turntable commences to rotate, a locating member disposed in the path of travel of the released article to locate said article centrally on said turntable, and means for withdrawing said locating member from the path of travel of said article as soon as the turntable commences to rotate.

4. Article orienting mechanism comprising infeed conveyor means, discharge conveyor means aligned therewith to carry articles through a substantially straight path of movement, a turn table movable between said conveyor means to transfer articles from the infeed to the discharge conveyor means, said turn table including a platform on which articles are seated and a depending stem, a member on which said stem is rotatably mounted, means for longitudially reciprocating said member, cam means for rotating said platform as said member is so reciprocated, a sleeve slidably mounted on said stem and connected thereto for rotative movement, side guides attached to said sleeve and spaced above said platform the width of said articles and means for lowering said sleeve when said turn table has been moved to the discharge conveyor to bring said side guides below the surface of said platform.

5. Article orienting mechanism as in claim 4, wherein guiding rods are spaced apart the width of the articles between the infeed conveyor means and the turntable and cam means are provided for swinging the guide rods outwardly as the turntable commences to rotate.

6. Article orienting mechanism as in claim 4, wherein a locating finger is disposed in the path of advance of a released article to position the same centrally on said platform, a sleeve is pivotally mounted at a point below the path of article travel and embracing said locating finger and means connecting said locating finger to the means for reciprocating said platform bearing member to withdraw said locating finger from the path of article travel upon movement of the platform away from the infeed conveyor means.

References Cited in the file of this patent

UNITED STATES PATENTS

| | | |
|---|---|---|
| 2,213,639 | Schellentrager | Sept. 3, 1940 |
| 2,371,926 | Schmitt | Mar. 20, 1945 |
| 2,525,132 | Herts | Oct. 10, 1950 |
| 2,727,647 | Luthi | Dec. 20, 1955 |